Figure 1:
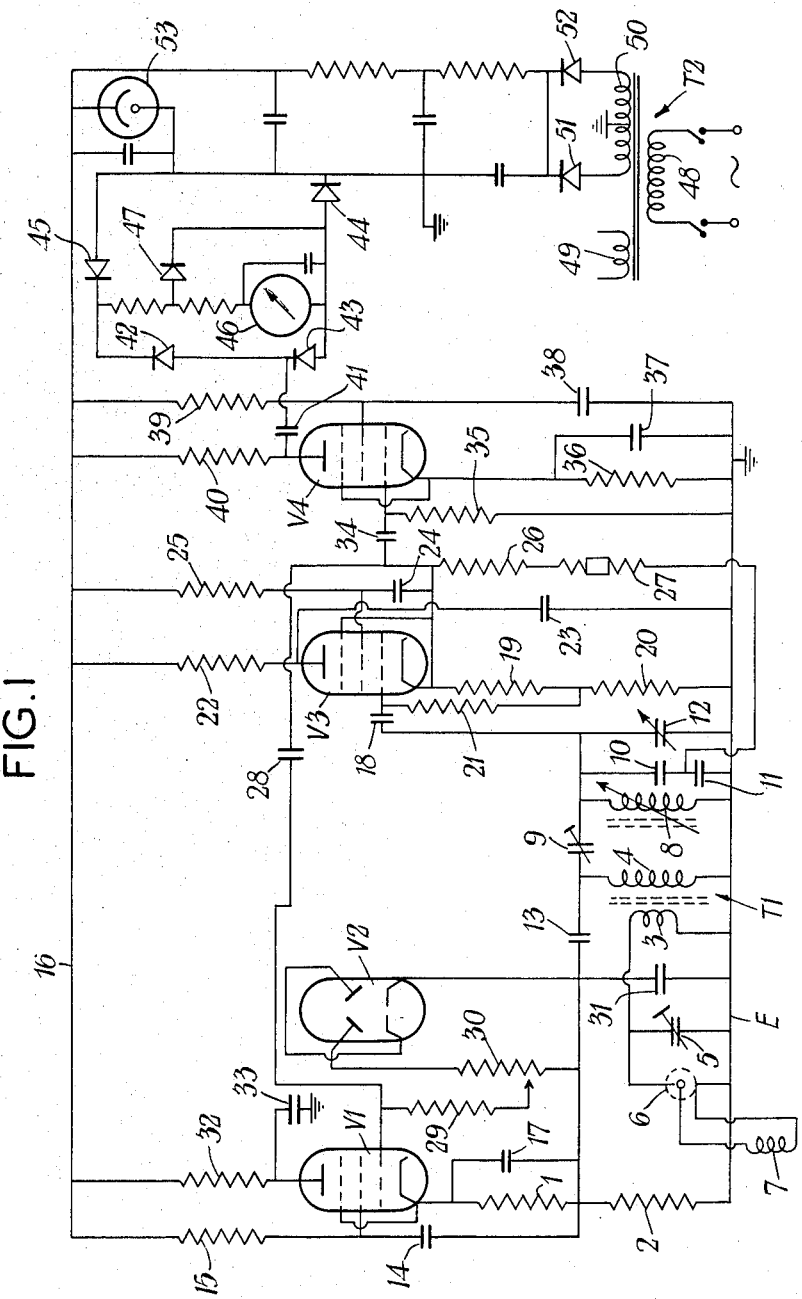

Inventor
REGINALD SEARLES YOUNG

United States Patent Office 3,260,927
Patented July 12, 1966

3,260,927
INSTRUMENT FOR MEASURING THE THICKNESS OF A NON-CONDUCTING FILM ON A BASE METAL WITH COMPENSATION FOR BASE RESISTIVITY AND AMBIENT TEMPERATURE
Reginald Searles Young, Higher Denham, near Uxbridge, England, assignor to The British Aluminium Company Limited, London, England, a company of Great Britain
Filed Sept. 1, 1961, Ser. No. 141,234
Claims priority, application Great Britain, Sept. 1, 1960, 30,219/60
11 Claims. (Cl. 324—34)

This invention relates to film-thickness measuring instruments and particularly concerned with such instruments for measuring the thickness of a substantially non-electrically conducting film on a base metal.

It is an object of the present invention to provide an improved instrument for measuring the thickness of a substantially non-electrically conducting film on a base metal which shall not require destruction of the sample being measured and which shall be substantially independent of the resistivity of the base metal.

It is a further object of the present invention to provide an improved instrument for measuring the thickness of substantially non-electrically conducting film on a base metal which shall be substantially independent of variations in the ambient temperature.

According to the present invention, an instrument for measuring the thickness of a substantially non-electrically conducting film on a base metal comprises an oscillatory circuit including an investigating coil adapted to be disposed in proximity to the film whereby the frequency and amplitude of oscillation of the circuit tend to change in the opposite sense to the resistivity of the base metal and an associated parallel inductive-capacitive circuit arranged to be tuned to a frequency lower than the frequency of oscillation such that the impedance of the tuned circuit tends to change in the opposite sense to the frequency of oscillation and a feed-back connection from the tuned circuit whereby any change in the frequency of oscillation due to a change in the resistivity of the base metal of the sample being measured is substantially compensated by a change in the impedance of the tuned circuit to maintain the amplitude of oscillation substantially independent of the resistivity of the base metal.

Preferably the feed-back connection includes a temperature responsive element, e.g. a thermistor, arranged to modify the feed back in the sense to oppose any variation in the amplitude of oscillation due to variations in the ambient temperature.

The invention extends to a tuned inductive-capactive circuit having an input and an output and a feed-back connection between the input and output embodying a temperature responsive-element, e.g. a thermistor, arranged to modify the feed back in the sense to oppose any variation in the Q of the circuit due to variations in the ambient temperature.

The invention further extends to an oscillatory circuit having an input and an output and a feed-back connection between the input and output embodying a temperature responsive element, e.g. a thermistor, arranged to modify the feed-back in the sense to oppose any variation in the amplitude of oscillation due to variations in the ambient temperature.

The invention also extends to an investigating head for an instrument for measuring the thickness of a substantially non-electrically conducting film on a base metal comprising an investigating coil associated with a core composed of iron dust and a ferrite material, e.g. that sold under the Registered Trade Mark "Ferroxcube," having a relatively higher magnetic permeability.

Preferably, the iron dust part of the core is of substantially annular cross-section surrounding the high permeability part of the core.

Advantageously, the investigating coil is wound around the high permeability part of the core in annular space between this part and the iron dust part of the core.

Figure 2:
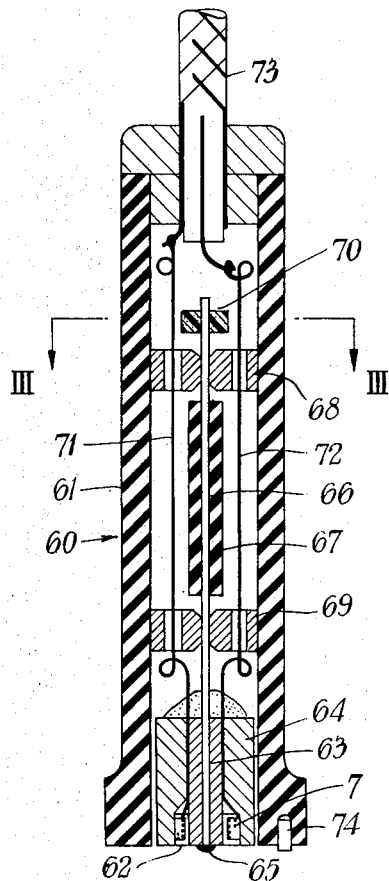
Figure 3:
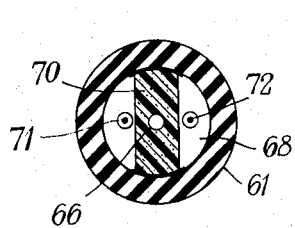
Figure 4:
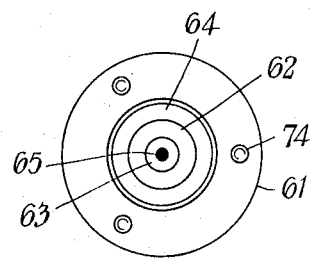

One embodiment of the invention will now be described by way of example, reference being made to the accompanying drawings in which:

FIG. 1 is a circuit diagram of an instrument for measuring the thickness of a substantially non-electrically conducting film on a base metal, FIG. 2 is a sectional view with parts in elevation of an investigating head for use with the instrument of FIG. 1, FIG. 3 is a section taken on the line III—III of FIG. 2, and FIG. 4 is an end elevation of the investigating head.

The circuit illustrated in FIG. 1 comprises an oscillatory circuit composed of a pentode tube $V_1$ having its suppressor grid strapped to its cathode and its cathode connected through resistors 1 and 2 in series to the low tension or ground line E and to one side of both the secondary and primary windings 3 and 4 respectively of a transformer $T_1$. The secondary winding 3 has a trimmer capacitor 5 connected thereacross and is connected across an input socket 6 intended to be connected across an investigating coil 7. The primary winding 4 is connected to a parallel tuned circuit composed of a variable inductor 8 connected in parallel with series connected capacitors 10 and 11 and a variable capacitor 12, through a trimmer capacitor 9. The capacitor 12 carries a pointer movable over a graduated scale (not shown). The side of the winding 4 remote from the ground line E is connected through a capacitor 13 to the junction of the resistors 1 and 2 and through a capacitor 14 to the screen grid of the tube $V_1$ this screen grid being connected through a resistor 15 to the high tension line 16 of the circuit. The cathode of the tube $V_1$ is connected through a capacitor 17 to the junction of the capacitors 13 and 14. The side of the winding 4 remote from the ground line E is also connected through the capacitor 9 and a further capacitor 18 to the control grid of a cathode follower tube $V_3$ which is a pentode valve having its suppressor grid strapped to its cathode and its cathode connected through resistors 19 and 20 to the ground line E. The junction of the resistors 19 and 20 is connected through a further resistor 21 to the control grid of the tube $V_3$. The anode of the tube $V_3$ is connected through a resistor 22 to the high tension line 16 and through a capacitor 23 to the ground line E. The cathode of the tube $V_3$ is also connected through a capacitor 24 to the screen grid of the tube which is connected through a resistor 25 to the high tension line 16 and this cathode is further connected through a resistor 26 and a thermistor 27 to the junction of the capacitors 10 and 11. This cathode is also connected to the control grid of the tube $V_1$ through a capacitor 28 and through a resistor 29 to the slider of a resistor 30 connected between one anode of a double diode tube $V_2$ and the junction of the capacitors 13 and 14. The other anode of the tube $V_2$ is connected to the one cathode associated with the one anode and the other cathode is connected to the junction of the capacitors 13 and 14 and through a capacitor 31 to the ground line E. The anode of the tube $V_1$ is connected through a resistor 32 to the high tension line 16 and through a capacitor 33 to ground.

The cathode of the tube $V_3$ is also connected through a capacitor 34 to the control grid of a pentode tube $V_4$, this grid being connected through a resistor 35 to the ground line E. The cathode of the tube $V_4$ is strapped to the suppressor grid thereof and is connected to the ground line E through a resistor 36 having a capacitor 37 connected in parallel therewith. Its screen grid is connected to the ground line E through a capacitor 38 and is connected through resistor 39 to the high tension line 16. The anode of the tube $V_4$ is connected through a resistor 40 to the high tension line 16 and through a capacitor 41 to a full wave bridge rectifier network comprising rectifiers 42, 43, 44 and 45 having a meter 46 connected thereacross and provided with a rectifier 47 to safeguard the meter 46 against overload.

The power supplies for the circuit are derived from a transformer $T_2$ the primary winding 48 of which is intended for connection across an ordinary A.C. supply and the one secondary winding 49 of which is for supplying the filaments of the tubes and the other secondary winding of which is centre-tapped and is connected through rectifiers 51 and 52 across a voltage stabiliser tube 53, one side of which is connected to ground and the other side of which is connected to the high tension line 16.

The investigating coil 7 is contained in an investigating head indicated generally at 60 in FIGURE 2 and composed of tubular housing 61 formed from an electrically insulating material and substantially closed at one end and open at the other or lower end. The investigating coil 7 is wound around a perspex bobbin 62 surrounding one end of a cylindrical ferrite core 63 composed of Ferroxcube material disposed within an iron dust casing 64 of annular cross-section closely surrounding the core 63 for the major part of its length but being of reduced internal dimension towards one end to leave an annular space in which the bobbin 62 is accommodated. The outer end of the ferrite core 63 has a synthetic sapphire 65 mounted therein and projecting therefrom as a part spherical surface. The iron dust casing 64 is slidable within the housing 61 and is capable of projecting from the open end thereof, the amount of projection being limited by a steel tube 66 adhesively secured to the inner end of the casing 64 and the core 63 and carrying a cylindrical stop 67 of polytetrafluoroethylene and the displacement of which is limited by annular bearing members 68 and 69 mounted within the housing 61 and acting as a guide for the tube 66. The innermost end of the tube 66 carries a foam plastic strip 70 which also limits the outermost displacement of the tube 66 by engaging with the bearing 68, the strip 70 also bearing against the inner wall of the housing 61 further to guide the tube 66. The two leads 71 and 72 from the investigating coil extend through perforations in the bearings 68 and 69 and are electrically connected respectively to the inner and outer conductors of a co-axial cable 73 which extends through the substantially closed end of the housing 61. Three equi-angularly disposed nylon screws 74 are provided in the end wall of the open end of the housing 61 to support the latter on a metal sheet when measurements are to be made.

In the operation of the instrument described the instrument is switched on and allowed to warm up for a few minutes before use. The investigating head 60 is placed on a standard sample having a substantially non-electrically conducting film of known thickness which, for example, is an anodic film on a plate of aluminum alloy. The housing 60 is supported on the film by the nylon screws 74 and the coil assembly composed of the investigating coil 7, bobbin 62, iron dust casing 64 and core 63 is supported on the sapphire 65. The capacitor 12 is adjusted so that its pointer indicates on the associated scale the known film thickness and the trimmer capacitor 5 is adjusted to bring the indication of the meter 46 to a predetermined reference level. The investigating head is placed several times on the sample so that a mean reading is obtained in order to guard against surface dust or imperfections and possible non-uniformity of film thickness. The trimmer capacitor 9 and inductor 8 are then adjusted on various samples of base metal having different resistivities until the indication on the meter 46 remains at the reference level independent of the resistivity of the base metal. The oscillator circuit of the instrument is, in effect, a modified form of electron coupled oscillator with grid feedback being obtained from the cathode follower tube $V_3$ and from the parallel tuned circuit which by the circuit arrangement provides a Q multiplier circuit which, by the provision of the thermistor 27, is temperature stable. The frequency of oscillation of the tube $V_1$, which is of the order of 300K c.p.p, tends to change in the opposite sense to the resistivity of the metal of the sample so that if this resistivity increases the frequency of oscillation decreases. If the resistivity of the metal increases, increased losses result so that the amplitude of oscillation also decreases. However, a decrease in frequency of oscillation results in an increase in the impedance of the parallel tuned circuit as the latter is arranged to be tuned to a frequency lower than the frequency of oscillation likely to be encountered in practice. This increase in impedance results in an increase in the feedback to the grid of the tube $V_1$ and compensates for any decrease in amplitude of oscillation due to increase in resistivity of the metal of the sample so that the amplitude of oscillation of the tube $V_1$ is independent of such resistivity.

When the instrument has been set up on a standard sample, the investigating head is then placed on the sample to be measured and the capacitor 12 is adjusted until the reading of the meter 46 is brought to the predetermined reference level. The indication of the pointer of the capacitor 12 will then give the film thickness of the sample under test. The effect of the spacing of the investigating head from the base metal due to the film thickness is that increases in such spacing result in decreases in the losses in the head producing a corresponding increase in the amplitude of oscillation of the valve $V_1$ whilst at the same time producing a reduction in frequency. This reduction in frequency brings the frequency of oscillation nearer to the frequency of the tuned parallel circuit so that the feed-back is increased resulting in a further increase in amplitude of oscillation of the valve $V_1$. The amplitude of oscillation of the valve $V_1$ therefore increases with increases in spacing of the investigating head from the base metal and hence with increases in film thickness and is therefore a function of the film thickness.

The high tension supplies are stabilised by the tube 53 and the arrangement of the double diode tube $V_2$ and resistors 29 and 30 is such that the instrument is independent of fluctuations in the heater current, the slider of the resistor 30 being adjustable to ensure that this is so. This is achieved in a manner known per se because the double diode valve $V_2$ effectively provides two contact potentials in series and ensures that the magnitude thereof is sufficient to enable a suitable value to be tapped off by the slider 30 to provide compensation for the tube $V_1$ against fluctuations in heater current.

It has been found that in operation an instrument such as that described above can measure a film of thickness, e.g. of anodic films, down to one micron in thickness with an accuracy of ±0.2 micron.

As will be appreciated the invention is of particular, but not exclusive, application in measuring the thickness of anodised films on aluminum or aluminum base alloys, e.g. motor car trims, where knowledge of the film thickness is of importance.

The construction of the head 60 due to the combination of the ferrite core 63 and the iron dust casing ensures that hysteresis effects are at a minimum and that the temperature coefficient of drift is also at a minimum. Tests using only a core of ferrite material such as Ferroxcube showed that a high temperature coefficient of drift was present in the circuit and was not compensatable since it was accompanied by a hysteresis effect. Iron dust cores alone were found to have a lower efficiency together with a considerable stray field although the temperature coefficient was less and in the opposite sense to that produced by the ferrite material. The combination of the two materials in the manner described above avoids these disadvantages, any drift in the instrument being readily corrected by a trimmer capacitor.

With a head in which the iron dust casing 64 has an external diameter of ⅜" and the ferrite core 63 has an external diameter of ⅛" the field was localised sufficiently to allow measurements to be made on samples down to a size of 1 in. square and, with little error, down to ¾" square. The area of the sample required for measurement could be reduced still further by using a "guard" ring, e.g. a disc of metal around the head, but for most purposes this is not necessary.

What I claim is:

1. An instrument for measuring the thickness of a substantially non-electrically conducting film on a base metal comprising an oscillatory circuit including an inductor movable into proximity to said film and operable to change the frequency and amplitude of oscillation of said circuit in the sense opposite to changes in the resistivity of the base metal and to change the amplitude of oscillation of said circuit in the same sense as changes in the spacing of said inductor from said base metal whilst changing the frequency of oscillation in the opposite sense to such changes in spacing, a feed-back loop across said oscillatory circuit, said loop including a parallel inductive-capacitive circuit in series with a cathode follower tube, said parallel inductive-capacitive circuit being tuned to a frequency lower than the frequency of oscillation of said oscillatory circuit and responsive to changes in the frequency of oscillation of said oscillatory circuit to oppose and compensate for changes in amplitude of such oscillations due to changes in resistivity of the base metal and to assist changes in amplitude of such oscillations due to changes in the spacing of said movable inductor from said base metal and a temperature responsive element electrically connected between the cathode circuit of said cathode follower tube and said parallel tuned circuit to modify the feed-back in said loop in the sense to oppose any variation in the Q of said parallel tuned circuit due to variations in ambient temperature.

2. An instrument according to claim 1 wherein said temperature responsive element is a thermistor.

3. An instrument for measuring the thickness of a substantially non-electrically conducting film on a base metal comprising a thermionic tube having at least an anode, a cathode, a control grid and a screen grid, a ground line, a resistor electrically connecting said cathode to said ground line, a transformer having primary and secondary windings each connected on one side to said ground line, an oscillatory circuit including said thermionic tube, said secondary winding and a first inductor movable into proximity with said film and connected across said secondary winding to change the frequency and amplitude of oscillation of said circuit in the sense opposite to changes in the resistivity of the base metal and to change the amplitude of oscillation of said circuit in the same sense as changes in the spacing of said first inductor from said base metal whilst changing the frequency of oscillation in the opposite sense to such changes in spacing, an electrical connection from the side of said primary winding remote from said ground line to said cathode and said screen grid, a feed-back loop across said oscillatory circuit comprising a parallel inductive-capacitive circuit in series with a cathode follower tube and an electrical connection from the cathode of said cathode follower tube to said control grid, said parallel inductive-capacitive circuit including a variable inductor electrically connected across said primary winding, two series connected capacitors connected across said variable inductor and a variable capacitor connected across said variable inductor, said parallel inductive-capacitive circuit being tuned to a frequency lower than the frequency of oscillation of the oscillatory circuit to oppose and compensate for changes in amplitude of such oscillations due to changes in resistivity of the base metal and to assist changes in amplitude of such oscillations due to changes in the spacing of said first inductor from said base metal and a thermistor electrically connected between the cathode of said cathode follower tube and the junction of said series connected capacitors to modify the feed-back in said loop in the sense to oppose any variation in the Q of said parallel tuned circuit due to variations in ambient temperature.

4. An instrument according to claim 3 including a double diode tube having two anodes each with an associated cathode, a variable resistor electrically connecting said control grid of said thermionic tube to one anode of said double diode, an electrical connection between the cathode associated wtih said one anode and the other of said two anodes, and a further capacitor connecting the cathode associated with said other anode to said ground line.

5. An instrument according to claim 3 including an investigating head and a core in said head associated with said first movable inductor, said core being composed of iron dust and a ferrite material having a relatively higher permeability.

6. An instrument according to claim 5 wherein the iron dust part of the core is of substantially annular cross-section surrounding the high permeability part of said core.

7. An instrument according to claim 6 wherein said first inductor is wounnd around the high permeability part of the core in an annular space between the two parts of the core.

8. An instrument according to claim 7 wherein a perspex bobbin is disposed in said annular space to support said first inductor.

9. An instrument according to claim 7 wherein said ferrite material is of cylindrical form having an outer end and a synthetic sapphire is mounted on said outer end to project therefrom as a part spherical surface.

10. An instrument according to claim 3 wherein said investigating head includes a housing in which said core is slidable and which has an open end from which said core can project, and including a tube attached to said core, annular bearing members mounted in said housing as guides for said tube and defining displacement limits for said core and a stop member on said tube for engagement with said bearing members at said limits of displacement.

11. An instrument according to claim 10 including three equi-angularly disposed screw members carried in the end wall of the open end of the housing to support the latter.

References Cited by the Examiner

UNITED STATES PATENTS

| | | | |
|---|---|---|---|
| 2,220,126 | 11/1940 | Six _____ | 336—83 |
| 2,478,773 | 8/1949 | McDill _____ | 324—40 |
| 2,581,394 | 1/1952 | Dinger _____ | 324—34 |
| 2,724,091 | 11/1955 | Klapperich _____ | 336—211 |
| 2,751,552 | 6/1956 | Brenner et al. _____ | 324—34 |
| 2,797,386 | 6/1957 | Callan _____ | 324—34 |
| 2,807,720 | 9/1957 | Charles _____ | 324—41 X |
| 2,809,346 | 10/1957 | Archer _____ | 324—40 |
| 2,895,108 | 7/1959 | Haddad et al. _____ | 324—41 X |
| 2,920,268 | 1/1960 | Young _____ | 324—40 X |
| 2,920,269 | 1/1960 | Hanysz et al. _____ | 324—40 |

FOREIGN PATENTS 659,794    5/1938    Germany.

WALTER L. CARLSON, *Primary Examiner.*

FREDERICK M. STRADER, *Examiner.*

R. B. LAPIN, R. J. CORCORAN, *Assistant Examiners.*